US005268981A

United States Patent [19]

Shahid

[11] Patent Number: 5,268,981

[45] Date of Patent: Dec. 7, 1993

[54] OPTICAL FIBER CONNECTOR METHODS USING A SUBSTRATE WITH AN APERTURE

[75] Inventor: Muhammed A. Shahid, Ewing Township, Mercer County, N.J.

[73] Assignee: AT&T Bell Laboratories, Murray Hill, N.J.

[21] Appl. No.: 976,745

[22] Filed: Nov. 16, 1992

[51] Int. Cl.[5] .................................................. G02B 6/38

[52] U.S. Cl. .......................................... 385/71; 385/59; 385/83

[58] Field of Search ........................ 385/71, 83, 55, 59, 385/14; 264/40.1; 425/116

[56] References Cited

U.S. PATENT DOCUMENTS

| | | | |
|---|---|---|---|
| 4,784,460 | 11/1988 | Khoe | 385/71 |
| 4,818,058 | 4/1989 | Bonanni | 385/71 |
| 4,933,262 | 6/1990 | Beguin | 385/14 |
| 4,998,796 | 3/1991 | Bonanni et al. | 385/83 |

OTHER PUBLICATIONS

"VLSI Technology," edited by S. M. Sze (McGraw Hill Book Company 1983) pp. 754–581.

*Primary Examiner*—John D. Lee

*Assistant Examiner*—Phan T. Heartney

*Attorney, Agent, or Firm*—Roderick B. Anderson

[57] ABSTRACT

An optical backplane is made by making an aperture (15) at each of a plurality of output ports (13). The optical fiber (12) is adhered to the substrate such that all of the optical fiber segments of each output port traverse the aperture of that port. Next, the optical fiber segments traversing each aperture are contained between a pair of first (18, 19) optical fiber support members on opposite sides. The support members are next encapsulated in a plastic encapsulation (24), preferably by injection molding. The encapsulation, support members and substrate are cut transversely to the optical fiber segments, and the exposed ends (27) of the optical fiber segments are polished. This provides a connector for the output port to which a matching array of optical fibers (32) contained between opposite second support members can be abutted and aligned so as to transmit light from the output port the second optical fibers. The support members also contain an alignment aperture (20), and identical second optical fiber support members are made to receive alignment pins (29) adapted to be inserted into matching alignment apertures for aligning the optical fiber segments to the second optical fibers.

15 Claims, 3 Drawing Sheets

OPTICAL FIBER CONNECTOR METHODS USING A SUBSTRATE WITH AN APERTURE

TECHNICAL FIELD

This invention relates to optical fiber interconnections and more particularly, to techniques for making connections to optical backplanes.

Background of the Invention

The copending application of J. J. Burack et. al., No. 07/934684 still co-pending filed Aug. 28, 1992, hereby incorporated herein by reference, describes a method for making optical backplanes by using a robotic routing machine to apply optical fibers to a flat surface of a flexible plastic substrate. Fibers are bonded to the substrate surface by a pressure-sensitive adhesive, and after routing they are covered by a plastic sheet that encapsulates them to protect them and to keep them in place. The optical fibers of the optical backplane are typically used as large-capacity transmission lines between printed wiring boards or between optical circuits.

The patent application describes how a computer is used to provide optical fibers of the appropriate length between input and output ports, or tabs of the optical backplane, it being important for optical transmission reliability that there not be minute deviations in the prescribed lengths of the various lines. The fiber paths are made of a single optical fiber that is looped between different output tabs during the fabrication so that a single test can be used to determine satisfactory optical transmission. After the test, the loops are severed by cutting through the substrate to define the various output tabs.

After fabrication, it is of course necessary to connect the fibers of the output tabs to optical fiber ribbons or other arrays of optical fibers. For making these connections, it is necessary to separate the plastic lamina of the output ports to expose the fibers and to apply optical fiber connectors or splices to permit their interconnection. The techniques of the Burack et al. invention are important because they allow optical backplanes to be mass-produced with precision, but with a minimum of operator skill. Any techniques that would further reduce the operator skill required or reduce the time and expense needed to provide interconnection to the output tabs of optical backplanes would similarly be considered an important advance.

SUMMARY OF THE INVENTION

An optical backplane is made by making an aperture at each of the output ports. The optical fiber is adhered to the substrate such that all of the optical fiber segments of each output port traverse the aperture of that port. Next, the optical fiber segments traversing each aperture are contained between a pair of first optical fiber support members on opposite sides of the array of fiber segments. The support members are next encapsulated in a plastic encapsulation, preferably by injection molding. The encapsulated support members and substrate are cut transversely to the optical fiber segments, and the exposed ends of the optical fiber segments are polished. This provides a connector for the output port to which a matching array of optical fibers contained between opposite second support members can be abutted and aligned so as to transmit light from the output port to the second optical fibers.

The optical fiber support members are made in a known manner from crystalline material so as to have individual grooves for supporting the individual optical fiber segments. The support members also contain an alignment aperture, and identical second optical fiber support members are made to receive alignment pins adapted to be inserted into a matching alignment apertures for aligning the optical fiber segments to the second optical fibers. These and other objects, features and advantages of the invention will be better understood from a consideration of the following detailed description taken in conjunction with the accompany drawing.

DETAILED DESCRIPTION

Figure 1:
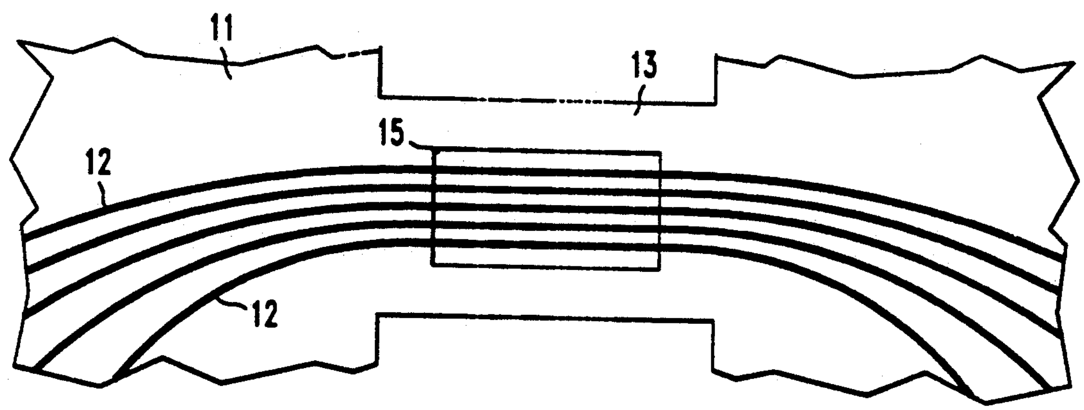
FIG. 1 is a top view of part of an optical backplane showing an output port.

The drawings are intended to be schematic, with the dimensions in some instances being distorted to aid in clarity of exposition. Referring now to FIG. 1, there is shown a top view of an optical backplane segment comprising a substrate 11 upon which an optical fiber 12 has been routed in a manner described in the aforementioned Burack et al. patent application. That application describes how single optical fiber can be repeatedly looped and directed over an output port output tab region by a routing machine. After completion of the routing, the transmission of the fiber can be tested by directing light through it, and thereafter the output port 13 may be severed transversely to the optical fiber so that a plurality of optical fiber paths are defined on the optical backplane substrate 11. It can be shown that it is possible to make two optical backplanes from a single strand of optical fiber 12 such that the substrate to the left of output port region 13 constitutes one optical backplane and the portion to the right of output port 13 constitutes another optical backplane. Alternatively, as described in the Burack et al. application, the portion to the right of output port 13 may merely be an area in which loops are formed in optical fiber 12, which will eventually be severed and wasted. A typical optical backplane contains a number of output ports, only one of which is shown in FIG. 1 for reasons of simplicity and clarity.

Figure 2:
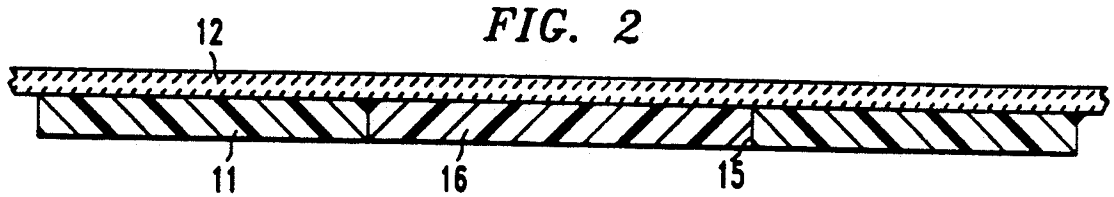
FIG. 2 is a sectional elevational view of the optical backplane of FIG. 1.

In accordance with an illustrative embodiment of the invention, an aperture 15 is made in substrate 11 in the output port region. As shown in FIG. 2 this aperture may be filled with a temporary spacer 16 so that the optical fiber 12 may be routed as shown in FIG. 1 without encountering any physical discontinuity. However, while it is contemplated that the substrate 11 include on an upper surface a pressure-sensitive adhesive for causing the adherence of optical fiber 12, no such adhesive is normally included on the upper surface of temporary portion 16. After the optical fiber 12 has been routed so as to define a plurality of optical fiber segments extending across aperture 15, the temporary portion 16 is removed so that the optical fiber segments are suspended across the aperture 15.

Figure 3:
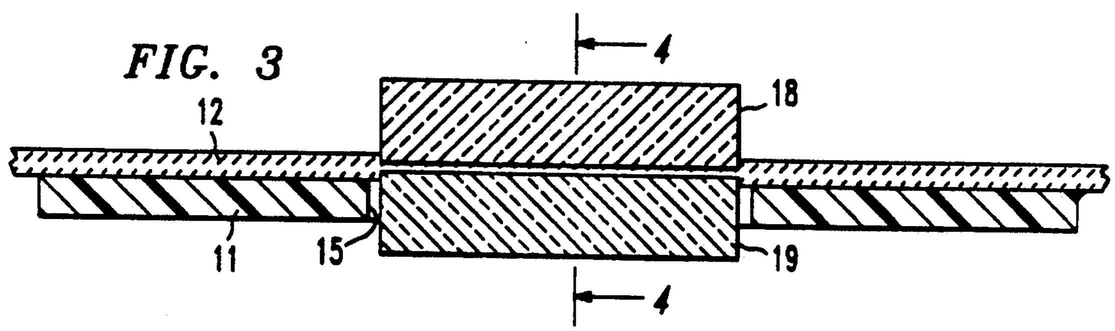
FIG. 3 shows the apparatus of FIG. 2 after fiber support members have been applied.
Figure 4:
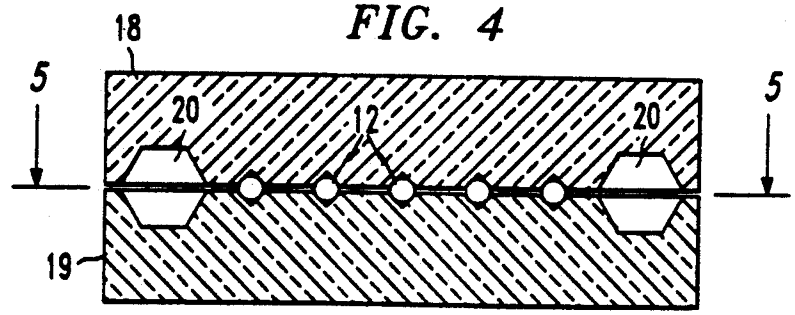
FIG. 4 is a view taken along lines 4—4 of FIG. 3.

The next step, illustrated in FIGs. 3 and 4, is to locate a matching pair of optical fiber support members 18 and 19 on opposite sides of the fiber segments extending across aperture 15. The support members 18 and 19 are made according to the principles outlined in the U.S. patents of Bonanni et al, U.S. Pat. Nos. 4,998,796, granted Mar. 21, 1991, and Bonanni, 4,818,058, granted Apr. 4, 1989, both incorporated herein by reference. These members are made by photolithographically masking and etching matching V-grooves on matching sides of each of the pair of support members 18 and 19. As is known, such grooves can be made with great precision in monocrystalline materials such as silicon, since sidewalls of the grooves are defined by crystallographic planes.

Figure 5:
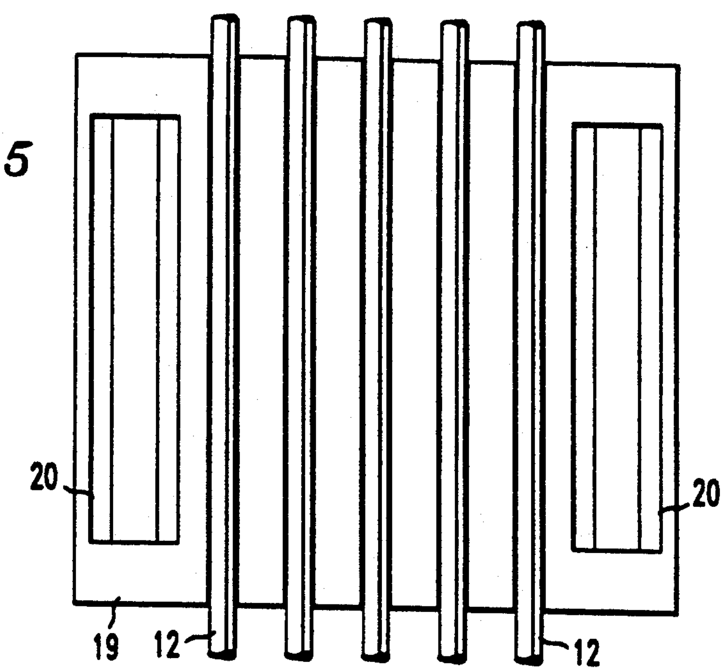
FIG. 5 is a view taken along lines 5—5 of FIG. 4.

A pair of alignment apertures 20 are also formed by photolithographic masking and etching to make matching grooves. As shown in FIG. 5, the alignment apertures 20 do not extend entirely along the length of support members 18 and 19, but rather are sealed off at their opposite extreme ends. As will become clear later, this is important for preventing encapsulant compound from being introduced into the apertures 20.

Figure 6:
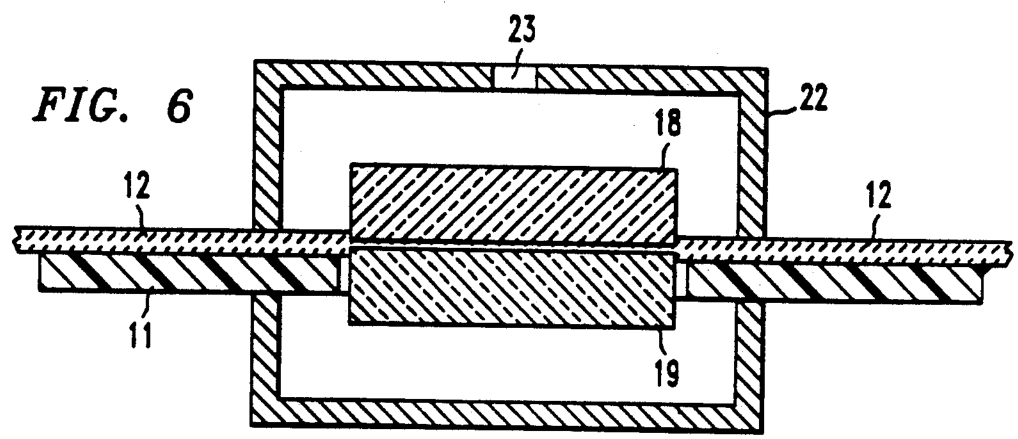
FIGS. 6 and 7 are views of the apparatus of FIG. 3 at subsequent stages of fabrication.

An advantage of the FIG. 4 structure is that optical fibers 20 center or "self-align" within matching grooves. The two optical fiber support members 18 and 19 may be bonded together with epoxy, but care should be taken to assure that no epoxy is introduced into the alignment apertures 19 since it may interfere with alignment, as will be clear later. Depending on the type of fiber and its intended use, the fiber coating may or may not be stripped prior to applying the support members 18 and Referring to FIG. 6, the bonded support members 18 and 19 are next placed in a mold 22 having an aperture 23 into which molding compound is injected as is described, for example, in pp.574–581 of the book, "VLSI Technology," by S. M. *Sze, McGraw Hill Book Company*, 1983. The molding compound may be injected at approximately one hundred seventy-five degrees Centigrade at pressures of about six megapascals. The molding compound may be any of various epoxies, thermoplastic polymers, silicones or other plastics. The compound covers support members 18 and 19 but, as mentioned before, is not injected into the alignment apertures 20 of FIGs. 4 and 5.

Figure 7:
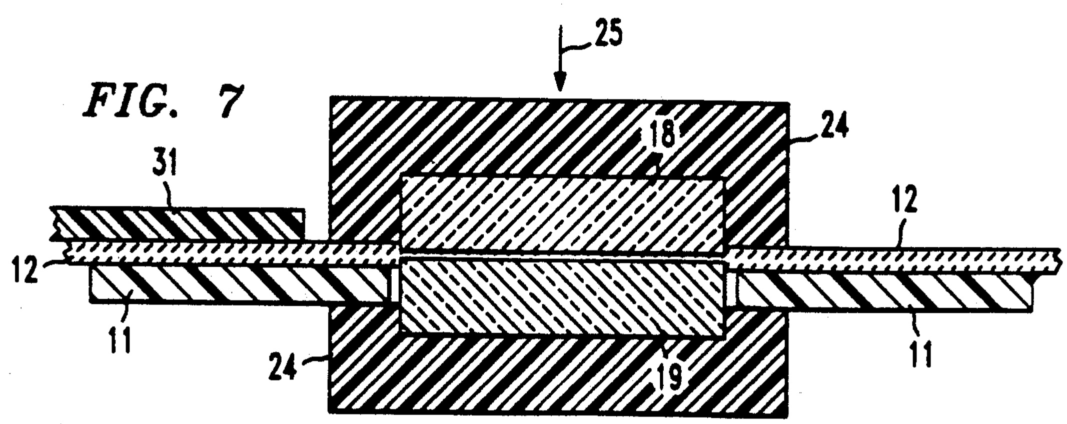

After the molding compound has hardened, it forms an encapsulation 24 as shown in FIG. 7. The encapsulation provides protection to the support member 18 and 19, as well as mechanical support. At this stage, the structure is self-supporting and an upper lamina 31 can be formed over optical fibers 20, as described in the Burack et al. application. Upper lamina 31 can be formed prior to encapsulation 24 and thereby be partially encapsulated by it. Next, the package is cut transversely with respect to the optical fiber 20 as shown By the arrow 25. At this stage, extra plastic can be applied to the connector-backplane interface for strain relief, if so desired.

Figure 8:
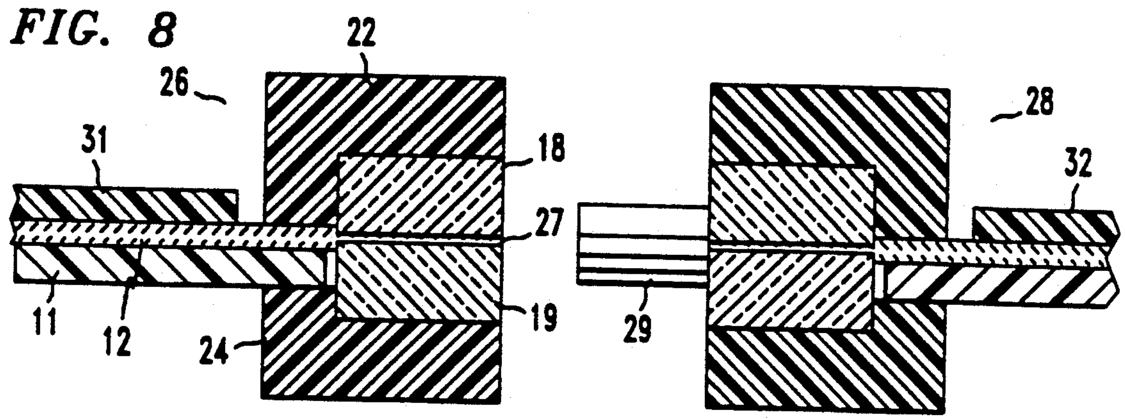
FIG. 8 is a sectional view of the apparatus of FIG. 7 at a subsequent stage of fabrication showing how optical fiber connections can be made.
Figure 9:
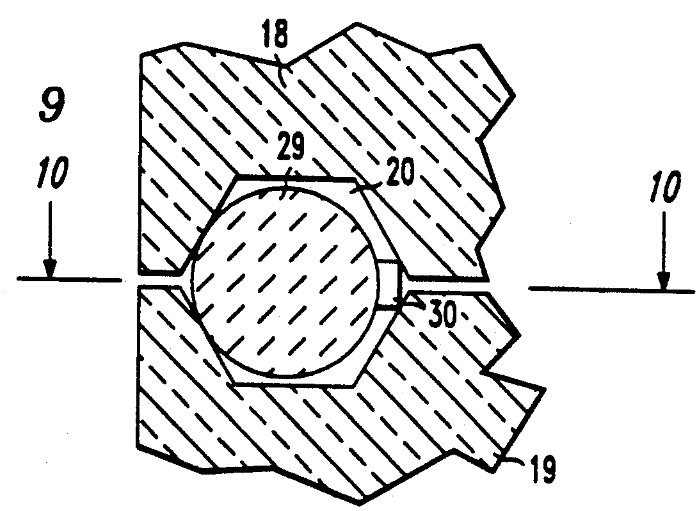
FIG. 9 is a sectional view showing how an alignment pin such as that shown in FIG. 8 can be used for aligning optical fiber.
Figure 10:
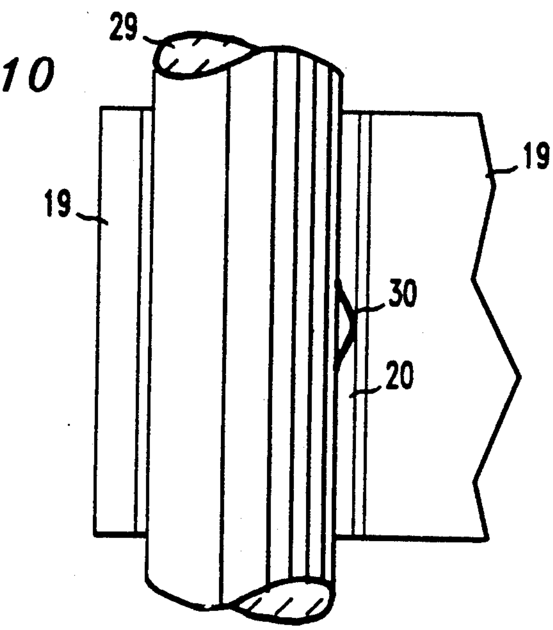
FIG. 10 is a view taken along lines 10—10 of FIG. 9.

After the cut has been made, as shown in FIG. 8, the half of the package 26 that surrounds the optical fiber 20 constitutes a connector for that optical fiber 20. Next, the exposed optical fiber ends 27 are polished to make them suitable for connection to substantially identical mating connectors. For example, a connection is made to a mating connector 28 by the use of an indexing pin 29. Referring again to FIGs. 4 and 5, when the optical fiber support members 18 and 19 are transversely cut, the alignment apertures 20 are exposed along with the optical fiber ends. As a consequence, alignment pins such as alignment pin 29 can be inserted into alignment apertures 20 of mating connectors as is shown in FIGs. 9 and 10.

The alignment pin 29 may have a spring 30 which biases it against one side of the alignment aperture 20. Since, as mentioned before, the sidewalls of alignment aperture 20 can be made with great precision, abutment against a reference surface of the alignment aperture accurately positions the alignment pin. With the alignment pin 29 being abutted against corresponding reference surfaces of the connectors 26 and 28 of FIG. 8, the two connectors can be accurately aligned. As a consequence, the polished ends 27 of the optical fibers 20 are accurately aligned with optical fibers 32 of FIG. 8. The alignment pin 29 can be supported in connector 28 by the spring mechanisms of FIGs. 9 and 10, or alternatively the pin may be permanently supported in connector 28 to make it a male connector that can be plugged into mating connectors such as connector 26.

In summary, a method has been shown for providing connectors to the output ports of an optical backplane as part of the fabrication process of the optical backplane. After completion of fabrication, the optical backplane can be connected to other optical backplanes or to optical fiber ribbons by simply plugging together matching connectors. Axial spring loading can be externally applied if so desired, as is known in the art. Also, a plastic spring can be produced as part of the molding operation for applying an axial spring bias. There is no need for individually attaching connectors to the output ports as is presently done. Experiment has shown that the connectors manufactured as described are quite robust and that the optical fiber ends are held in precision alignment, notwithstanding rough handling of the completed backplane. Finally, the invention assures that, after polishing the fiber ends, the fibers will be of a predictable precise length, which may not be true individual manual connectorization and polishing operations. The embodiments described, however, are only intended to be illustrative of the inventive concept. Various other embodiments and modifications of the invention may be made by those skilled in the art without departing from the spirit and scope of the invention.

I claim:

1. A method for making an optical fiber interconnection comprising the steps of:

making a substrate with at least one aperture;

adhering at least one optical fiber to the substrate such that at least one optical fiber segment traverses the aperture;

containing the optical fiber segment between a pair of first optical fiber support members on opposite sides thereof;

cutting transversely to the optical fiber segment through the first support members, the optical fiber segment and the substrate;

polishing an exposed end of the optical fiber segment;

and aligning and abutting a second optical fiber contained between opposite second optical fiber support members with said optical fiber segment such that optical energy can be transmitted from the optical fiber segment to the second optical fiber.

2. The method of claim 1 wherein: the optical fiber support members define an alignment aperture that extends substantially parallel to the optical fiber segments; and the optical fiber segments supporting the second optical fibers contains an alignment pin adapted to be inserted into the alignment aperture.

3. The method of claim 1 wherein:
a plurality of optical fiber segments are contained by the optical fiber support members;
and a plurality of second optical fibers are contained by second optical fiber support members and are abutted against the optical fiber segments.

4. The method of claim 3 further comprising the step of:
after the containing step, encapsulating the support members in a plastic encapsulation;
and wherein the cutting step further comprises the step of cutting through the plastic encapsulation.

5. The method of claim 4 wherein:
the optical fiber support members are made of a crystalline material in which individual grooves for supporting individual optical fiber segments have been made by photolithographic masking and etching.

6. The method of claim 5, wherein:
during the adhering step, a substrate segment of substantially the same thickness as the substrate is used to fill the aperture such that the optical fiber segments contact the substrate portion;
and after the adhering step, the substrate portion is removed from contact to the optical fiber segments.

7. The method of claim 4 wherein:
the optical fiber support members define an alignment aperture that extends substantially parallel to the optical fiber segments, but which is substantially sealed from the environment during the encapsulating step, whereby no plastic is injected into the alignment aperture;
the cutting step further comprises the step of cutting through the aperture, thereby to expose the aperture;
and the optical fiber segments supporting the second optical fibers contains an alignment pin adapted to be inserted into the alignment aperture.

8. The method of claim 7 wherein:
during the adhering step, a substrate segment is used to fill the aperture such that the optical fiber segments contact the substrate portion;
after the adhering step, the substrate segment is removed from contact to the optical fiber segments;
and the optical fiber support members are made of a crystalline material in which individual grooves for supporting individual optical fiber segments have been made by photolithographic masking and etching.

9. The method of claim 8 wherein:
the substrate constitutes part of an optical backplane and comprises a plurality of terminal ends;
each terminal end includes an aperture;
the adhering step comprises the step of adhering one optical fiber such that it makes multiple traverses of each aperture;
and the steps of claim 8 are performed on the optical fiber segments of each aperture.

10. The method of claim 9 wherein:
prior to the cutting step, the optical fiber is tested by directing light in one end thereof and detecting it from another end thereof.

11. The method of claim 10 wherein:
each alignment pin includes a spring member adapted to spring bias one side of the alignment pin against one side of the alignment aperture.

12. A method for making an optical backplane comprising the steps of:
making a substrate with at least one output port and one aperture at the output port;
including a substrate segment within the aperture;
adhering a plurality of optical fibers to the substrate such that a plurality of optical fiber segments traverse the aperture;
forming by photolithographic masking and etching matching V-grooves on matching surfaces of a pair of monocrystalline support members;
containing the optical fiber segments within matching V-grooves of the support members on opposite sides thereof;
encapsulating the optical fiber segments in a plastic encapsulant material;
cutting transversely to the optical fiber segments through the encapsulant, the support members, the optical fiber segments and the substrate;
polishing exposed ends of the optical fiber segments;
and aligning and abutting second optical fiber segments with said optical fiber segments such that optical energy can be transmitted therebetween.

13. The method of claim 12 further comprising the step of:
forming within the optical fiber support members alignment grooves which together define an alignment aperture that extends substantially parallel to the optical fiber grooves but which is substantially sealed from the environment during the encapsulating step, whereby no plastic is injected into the alignment aperture;
said alignment aperture being adapted to receive an alignment pin for aligning the ends of the optical fiber segments with the ends of other optical fibers.

14. The method of claim 13 wherein:
the alignment grooves are made by photolithographic masking and etching. etching.

15. The method of claim 14 wherein:
the alignment pin includes a spring member adapted to spring bias one side of the alignment pin against one side of the alignment aperture.

* * * * *